Figure 1:
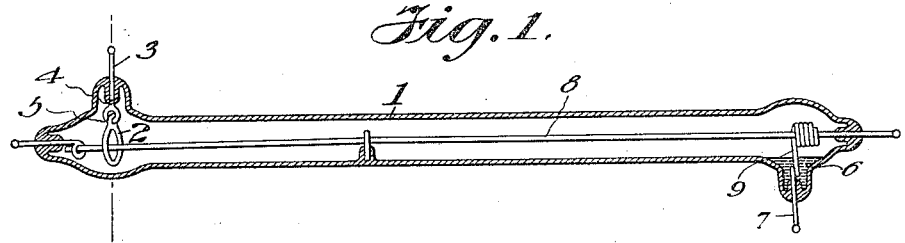

P. C. HEWITT.
VAPOR ELECTRIC DEVICE.
APPLICATION FILED DEC. 6, 1910.

1,064,689.

Patented June 10, 1913.

WITNESSES:
Chas. F. Clagett
Thos. H. Brown

INVENTOR
Peter Cooper Hewitt
BY
Charles A. Terry
ATTORNEY

UNITED STATES PATENT OFFICE.

PETER COOPER HEWITT, OF RINGWOOD MANOR, NEW JERSEY, ASSIGNOR, BY MESNE ASSIGNMENTS, TO COOPER HEWITT ELECTRIC COMPANY, OF HOBOKEN, NEW JERSEY, A CORPORATION OF NEW JERSEY.

VAPOR ELECTRIC DEVICE.

1,064,689.  Specification of Letters Patent.  Patented June 10, 1913.

Application filed December 6, 1910. Serial No. 595,948.

*To all whom it may concern:*

Be it known that I, PETER COOPER HEWITT, a citizen of the United States, and resident of Ringwood Manor, county of Passaic, State of New Jersey, have invented certain new and useful Improvements in Vapor Electric Devices, of which the following is a specification.

My invention relates to that class of electric apparatus in which the conducting medium is a vapor or gas.

The apparatus may be used as a lamp or source of light or for various other purposes.

In certain patents issued to me on the 17th day of September, 1901, for example, United States Patent Number 682,690 and 682,695, I have described various forms of vapor or gas electric lamps, and the present invention relates more particularly to means for conveniently starting and operating lamps or other gas or vapor electric apparatus in which the phenomena at the negative electrode constitute an important part of the resistance to starting.

I have found that in a device having a vapor or gas path intervening between the negative and positive electrode, under certain conditions of purity, there is an apparent reluctance on the part of the current to enter the negative electrode. I have further found that the tendency of the current is to assume a path between the positive electrode and that portion of the negative electrode which is remote therefrom. For instance, in a tube of considerable length constituting the inclosing chamber of the device, if a conducting rod constituting an extension of the negative electrode be extended through a considerable portion of the length of the tube, the current will enter the negative electrode at a point, generally speaking, as remote as possible from the positive electrode, instead of traversing the extended conductor. The exact explanation of this phenomenon is not essential to a description of my invention. From experiments which I have made, however, I believe that it is proven beyond reasonable doubt that the currents tends to remain in the vapor path as long as possible before entering the negative electrode.

For the purpose of starting the device, I sometimes employ some special means for overcoming the initial reluctance of the current to traverse the space immediately surrounding the negative electrode. I have found, however, that by making an actual electrical contact between the positive and negative electrodes and then separating the two while current is flowing, it will continue to flow under the influence of a moderate difference of potential, the negative resistance phenomenon to starting having thus been eliminated. I avail myself of the phenomenon of the reluctance of the current to enter the negative electrode by extending the negative electrode of the device to a point near the positive electrode and providing means for first bringing the two electrodes into electrical contact and then causing a break or open space to be made between the two whereupon the current which is first established at the junction is caused by the phenomenon to pass through the vapor and immediately traverse the device, entering the negative electrode remote from the positive electrode. Many different means may be employed for securing the initial contact between the electrodes and obtaining the break in the continuity thereof.

For purposes of illustration I may select an apparatus containing mercury as the negative electrode, and I may cause a rod of some conducting material to pass from the negative electrode into and through a considerable length of vapor, that is to say, through practically the entire operating vapor path. In electrical contact with the remote end of this rod, I may bring the positive electrode (which may be of iron or other suitable material), and I may arrange the parts so that one or the other of the two electrodes shall be movable, whereby it shall be made possible to bring the electrodes into contact or separate them at will, or I may use a bridging piece for the same purpose. In order to render the operation of the movable electrode automatic, it may be of iron or I may connect with it a piece of magnetic material, such as iron, and I may cause this iron piece to be acted upon by a magnet or solenoid outside the inclosing vessel of the lamp or by rotating the apparatus may cause gravity to act. By including the two electrodes in the circuit of the magnet or solenoid, when the electrodes are in contact, I may cause the initial current passing through the contacting electrodes to separate the contacts and to bring about the condition in which the current selects the vapor path instead of the path through the solid extension of the negative electrode. Other means of separating the electrodes may be employed.

Instead of moving one or the other of the electrodes within the apparatus by direct action upon the movable part itself, the desired separation of the relatively movable parts may be brought about by a movement of the container either by hand or by automatic means.

This feature of my invention is illustrated in the accompanying drawings, in which—

Figure 2:
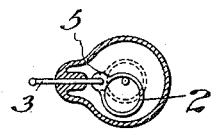
Figure 3:
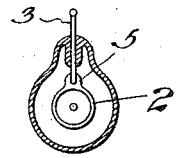
Figure 4:
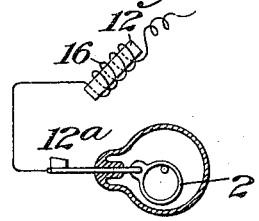

Figure 1 is a longitudinal section of a vapor apparatus embodying my invention; Figs. 2 and 3 are transverse sections of the same illustrating two different positions of the apparatus; and Fig. 4 is a section similar to Fig. 2, showing also automatic means for moving the body of the device.

In the drawing, the container, which may conveniently be of glass, is shown at 1, and the positive electrode at 2, the same being in the form of a ring so connected to the inner end of the lead-wire, 3, as to be practically hinged thereto whereby the ring may be dropped by gravity into different positions depending upon the position of the container 1. The connection illustrated consists of an eye, 4, on the inner end of the lead-wire 3 and a coöperating eye, 5, formed on the ring 2.

The negative electrode is shown at 6 and is provided with a suitable lead-wire, 7, for connection with the outside circuit.

Through the apparatus extends a conducting rod, 8, suitably supported at its ends, and if need be at one or more intermediate points. This rod is connected by a wire or other conductor, 9, with the negative electrode 6 and when the apparatus is not in operation it may be turned so that the positive electrode 2, of ring form, will drop into contact with the conductor 8, as clearly shown in Fig. 2. Should current now be turned on in the tube circuit, it will flow through the apparatus between the lead-wire 2 and the lead-wire 7, by way of the ring electrode 2, the conductors 8 and 9 and the negative electrode 6. To start the apparatus into operation, the container 1 may be moved by hand or otherwise so as to bring the lead-wire 3 to the top of the apparatus, under which circumstances the ring electrode 2 will occupy the position illustrated in Fig. 3, where the ring is no longer in contact with the conductor 8, having been separated therefrom by the described movement of the container.

In Fig. 4, the container may be moved automatically by means of an electric magnet comprising a coil, 16, surrounding a core, 12, and acting upon an armature, 12$^a$, attached in any suitable manner to the container and adapted to rotate it slightly upon its axis in response to the attraction of the core 12, the coil 16 being included in the circuit leading to the ring electrode 2$^a$. It is found that the separation thus caused, by first establishing a flow of current through a portion of the vapor between the conductor 8 and the ring conductor 2, the original reluctance to starting which obtains in apparatus of this class is broken down and the flow then extends through substantially the entire vapor path between the main positive and negative electrodes.

The present application is a continuation in part of my application Serial Number 258,149, filed May 1st, 1905.

I claim as my invention:—

1. The combination with a vapor apparatus provided with a normally closed internal circuit, of an electromagnet external to the apparatus included in the said circuit and mechanical connections between the magnet armature and the apparatus for rupturing the said internal circuit when the magnet is energized.

2. The combination of a vapor electric lamp movably supported in a substantially horizontal position, with positive means for moving the lamp out of its normal position by rocking it around an axis of motion parallel to the axis of the lamp.

3. The combination of a tubular mercury vapor apparatus supported in an approximately horizontal position and having electrodes near its respective ends and means for turning it around a horizontal axis.

Signed at New York in the county of New York and State of New York this 5th day of December, A. D. 1910.

PETER COOPER HEWITT.

Witnesses:
  Wm. H. Capel,
  Thos. H. Brown.